United States Patent
Park et al.

(10) Patent No.: US 8,140,122 B2
(45) Date of Patent: Mar. 20, 2012

(54) APPARATUS AND METHOD FOR CHANGING COMMUNICATION MODE IN MULTI-ANTENNA SYSTEM CONSIDERING CHANNEL ENVIRONMENT

(75) Inventors: Byung-Joon Park, Seoul (KR); Myung-Kwang Byun, Suwon (KR); Jeong-Tae Oh, Yongin-si (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 12/660,432

(22) Filed: Feb. 26, 2010

(65) Prior Publication Data

US 2010/0215088 A1 Aug. 26, 2010

(30) Foreign Application Priority Data

Feb. 26, 2009 (KR) ........................ 10-2009-0016155

(51) Int. Cl.
*H04B 1/38* (2006.01)
*H04M 1/00* (2006.01)

(52) U.S. Cl. .................. 455/561; 455/562.1; 455/575.7; 455/63.1; 455/101; 455/67.11; 455/522; 455/452.1; 370/329; 370/341; 370/328; 375/148; 375/278; 375/267

(58) Field of Classification Search .................. 455/561, 455/562.1, 575.7, 63.1, 101, 114.2, 522, 455/67.11, 67.13, 450, 452.1
See application file for complete search history.

(56) References Cited

U.S. PATENT DOCUMENTS

| | | | |
|---|---|---|---|
| 7,366,247 B2 * | 4/2008 | Kim et al. ..................... | 375/267 |
| 7,369,876 B2 * | 5/2008 | Lee et al. ...................... | 455/561 |
| 7,808,944 B2 * | 10/2010 | Marinier ....................... | 370/318 |
| 7,844,232 B2 * | 11/2010 | Wu et al. ...................... | 455/90.3 |
| 7,881,673 B2 * | 2/2011 | Kent et al. ................... | 455/67.11 |
| 7,881,739 B2 * | 2/2011 | Sarkar et al. .................. | 455/522 |
| 7,885,288 B2 * | 2/2011 | Kent et al. ..................... | 370/464 |
| 7,949,061 B2 * | 5/2011 | Tong et al. .................... | 375/260 |
| 8,009,778 B2 * | 8/2011 | Mielczarek et al. .......... | 375/346 |
| 8,031,789 B2 * | 10/2011 | Ionescu et al. ................ | 375/260 |

* cited by examiner

*Primary Examiner* — Marceau Milord

(57) ABSTRACT

An apparatus and a method for determining a multi-antenna transmission mode at a base station in a multi-antenna system are provided. The method for determining the multi-antenna transmission mode includes when using a Multiple Input Multiple Output (MIMO) transmission mode as a multi-antenna transmission mode, determining a reference set point; updating a set point for transmit power control of a terminal according to an error occurrence of a signal received from the terminal; determining whether a channel to the terminal is a channel for applying the MIMO transmission mode by comparing the updated set point with the reference set point; and when the channel to the terminal is not a channel for applying the MIMO transmission mode, changing the multi-antenna transmission mode to a fixed transmission mode.

20 Claims, 7 Drawing Sheets

APPARATUS AND METHOD FOR CHANGING COMMUNICATION MODE IN MULTI-ANTENNA SYSTEM CONSIDERING CHANNEL ENVIRONMENT

CROSS REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 26, 2009 and assigned Serial No. 10-2009-0016155, the entire disclosure of which is hereby incorporated by reference.

TECHNICAL FIELD OF THE INVENTION

The present invention relates generally to an apparatus and a method for determining a multi-antenna transmission mode in a multi-antenna system. More particularly, the present invention relates to an apparatus and a method for determining a multi-antenna transmission mode of uplink by considering Line of Sight (LOS) channel environment information in a multi-antenna system.

BACKGROUND OF THE INVENTION

Rapid growth of the wireless mobile communication market demands various multimedia services in a wireless environment. To provide the multimedia services, as large capacity of transmission data and high speed of the data transfer are under way, researches are conducted on multi-antenna systems for efficiently using the limited frequencies. A representative transmission mode of the multi-antenna system includes a Multiple Input Multiple Output (MIMO) transmission mode.

Using the MIMO transmission, a transmitter and a receiver of a multi-antenna system send and receive signals over a plurality of antennas. Compared to a single antenna system, the MIMO multi-antenna system can raise the transmission reliability and the data rate by using independent channels per antenna without requiring additional frequency or additional transmit power.

As such, the MIMO multi-antenna system can efficiently transmit signals only when the channel independence of the antennas is guaranteed. When the channel independence of the antennas is not guaranteed, the MIMO receiver cannot distinguish the signals received via the antennas and not efficiently carry out the MIMO transmission. For example, in a Line of Sight (LOS) channel environment, the multi-antenna system cannot ensure channel independence between the antennas. As a result, the receiver cannot distinguish the signals received over the antennas and cannot efficiently fulfill the MIMO transmission in the LOS channel environment.

SUMMARY OF THE INVENTION

To address the above-discussed deficiencies of the prior art, it is a primary object to provide at least the advantages described below. Accordingly, an aspect of the present invention is to provide an apparatus and a method for determining a multi-antenna transmission mode in a multi-antenna system.

Another aspect of the present invention is to provide an apparatus and a method for checking a Line of Sight (LOS) channel environment in a multi-antenna system.

Yet another aspect of the present invention is to provide an apparatus and a method for a base station to check a LOS channel environment by considering variation of a set point for power control of a terminal in a multi-antenna system.

Still another aspect of the present invention is to provide an apparatus and a method for a base station to check a LOS channel environment by considering variation of a carrier to interference and noise ratio of a signal received from a terminal in a multi-antenna system.

A further aspect of the present invention is to provide an apparatus and a method for determining a multi-antenna transmission mode of uplink by considering LOS channel environment information in a multi-antenna system.

According to one aspect of the present invention, a method for determining a multi-antenna transmission mode at a base station in a multi-antenna system includes when operating in a Multiple Input Multiple Output (MIMO) transmission mode as a multi-antenna transmission mode, determining a reference set point; updating a set point for transmit power control of a terminal according to error occurrence of a signal received from the terminal; determining whether a channel to the terminal is a channel for applying the MIMO transmission mode by comparing the updated set point with the reference set point; and when the channel to the terminal is not the channel for applying the MIMO transmission mode, changing the multi-antenna transmission mode to a fixed transmission mode. The reference set point includes a value for determining whether the channel to the terminal is the channel for applying the MIMO transmission mode, and the fixed transmission mode is a multi-antenna transmission mode operating in a Single Input Multiple Output (SIMO) transmission mode during a reference time.

According to another aspect of the present invention, a method for determining a multi-antenna transmission mode at a base station in a multi-antenna system includes when operating a MIMO transmission mode as a multi-antenna transmission mode, determining a reference Carrier to Interference and Noise Ratio (CINR); measuring a CINR using a signal received from a terminal; determining whether a channel to the terminal is a channel for applying the MIMO transmission mode by comparing the measured CINR with the reference CINR; and when the channel to the terminal is not the channel for applying the MIMO transmission mode, changing the multi-antenna transmission mode to a fixed transmission mode. The reference CINR includes a CINR for determining whether the channel to the terminal is the channel for applying the MIMO transmission mode, and the fixed transmission mode is a multi-antenna transmission mode operating in a SIMO transmission mode during a reference time.

According to yet another aspect of the present invention, an apparatus for determining a multi-antenna transmission mode at a base station in a multi-antenna system includes at least two antennas; a receiver configured to receive a signal via the antennas; a power controller configured to update a set point for transmit power control of a terminal according to an error occurrence in a signal received from the terminal when using a MIMO transmission mode as a multi-antenna transmission mode; a channel checker configured to determine whether a channel to the terminal is a channel for applying the MIMO transmission mode by comparing the set point updated by the power controller with a reference set point; and a mode determiner configured to select the multi-antenna transmission mode over a fixed transmission mode when the channel to the terminal is not the channel for applying the MIMO transmission mode. The reference set point includes a value for determining whether the channel to the terminal is the channel for applying the MIMO transmission mode, and the fixed transmission mode is a multi-antenna transmission mode operating in a Single Input Multiple Output (SIMO) transmission mode during a reference time.

According to still another aspect of the present invention, an apparatus for determining a multi-antenna transmission mode at a base station in a multi-antenna system includes at least two antennas; a receiver configured to receive a signal via the antennas; a channel estimator configured to measure a CINR using a signal received from a terminal when using a MIMO transmission mode as a multi-antenna transmission mode of an uplink; a channel checker configured to determine whether a channel to the terminal is a channel for applying the MIMO transmission mode by comparing the CINR measured by the channel estimator with a reference CINR; and a mode determiner configured to select the multi-antenna transmission mode over a fixed transmission mode when the channel to the terminal is not the channel for applying the MIMO transmission mode. The reference CINR includes a CINR for checking whether the channel to the terminal is the channel for applying the MIMO transmission mode, and the fixed transmission mode is a multi-antenna transmission mode operating in a SIMO transmission mode during a reference time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for determining a multi-antenna transmission mode in a multi-antenna system.

Hereinafter, it is assumed that the multi-antenna transmission mode in the uplink is determined by taking into account the Line of Sight (LOS) channel environment information in the multi-antenna system.

A base station of the multi-antenna system controls a transmit power of a terminal according to error in a signal received from the terminal. That is, the base station adjusts a set point for controlling the power of the terminal such that a carrier to interference and noise ratio of the received signal meets a required Bit Error Rate (BER). For example, depending on the error in the signal received from the terminal, the base station adjusts the set point based on Equation:

$$setpointT_{new} = setpointT + \text{OuterLp\_Step if, } PacketError \quad \text{[Eqn. 1]}$$
$$setpointT_{new} = setpointT - \text{OuterLp\_Step} \times \frac{Per_{target}}{1 - Per_{target}} \text{ if,}$$
$$\text{No } PacketError$$

In Equation 1, setpointT$_{new}$ denotes an updated set point for the power control of the terminal, setpointT denotes the set point before the updating, OuterLp_Step denotes an update size of the set point for the power control of the terminal, and PER$_{target}$ denotes a target Packet Error Rate (PER) of the terminal.

When the received signal includes error as expressed in Equation 1, the base station increases the set point for the power control of the terminal by a preset reference value OuterLp_Step. When the received signal is free from error, the base station decreases the set point for the power control of the terminal in proportion to PER$_{target}$.

Next, when the set point for the power control of the terminal exceeds a power control reference, the base station sends a power change signal to the terminal so as to alter the transmit power of the terminal.

Figure 1:
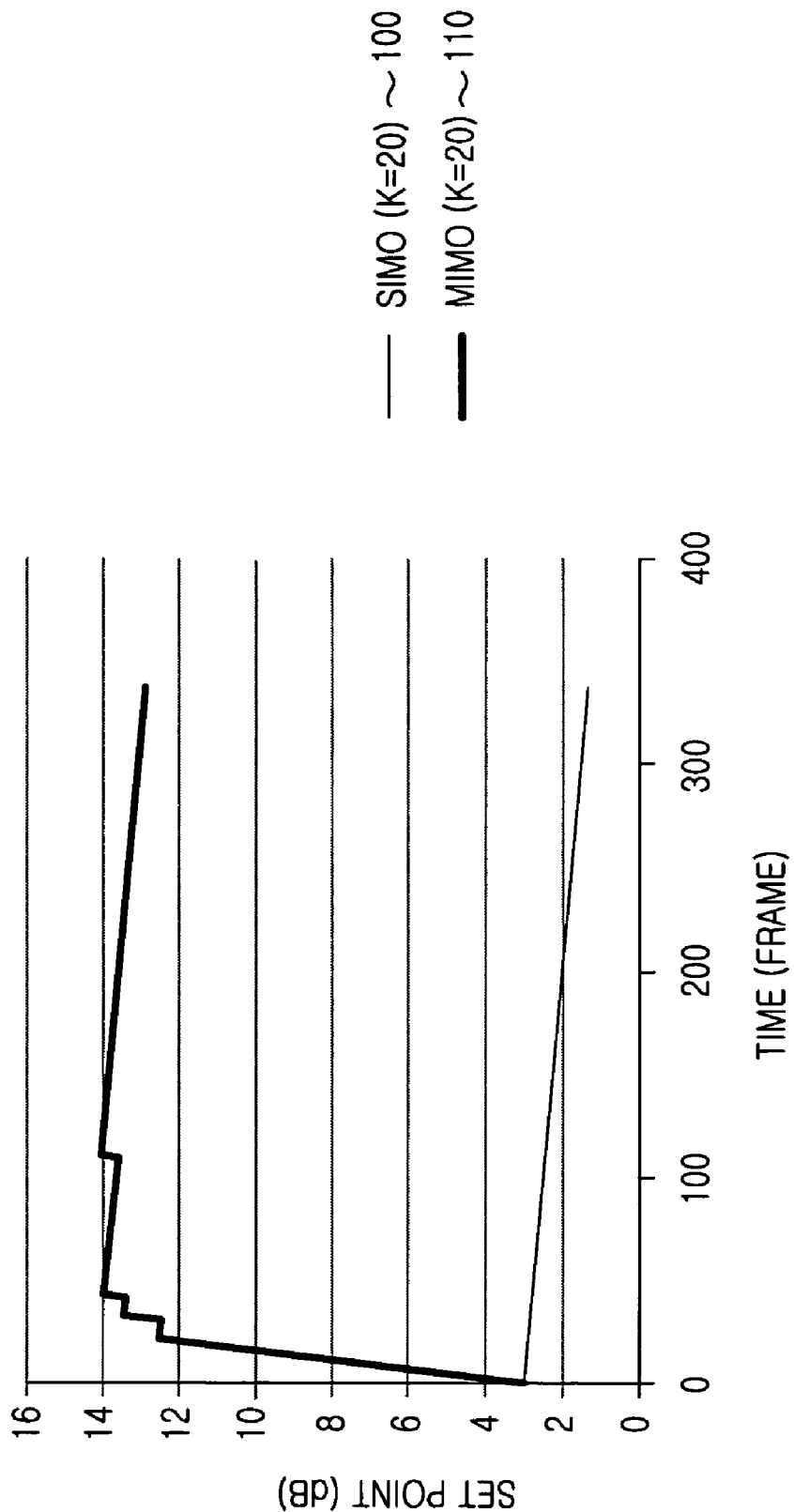
FIG. 1 illustrates set point variation in a Line of Sight (LOS) channel according to an exemplary embodiment of the present invention.

In the case of a Multiple Input Multiple Output (MIMO) transmission mode, the receive data has error in the LOS channel environment, and the base station continuously increases the set point for the power control of the terminal as shown in FIG. 1. Herein, the MIMO transmission mode indicates a multi-antenna transmission mode which transmits and receives signals using a plurality of antennas at a transmitter and a plurality of antennas at a receiver as well.

FIG. 1 illustrates set point variation in a LOS channel according to an exemplary embodiment of the present invention.

In a Single Input Multiple Output (SIMO) transmission mode as shown in FIG. 1, the base station encounters more error in the received data under a non-LOS channel environment than the LOS channel environment. Thus, in the SIMO transmission mode in the LOS channel environment, a first set point 100 for the power control of the terminal continuously decreases. Herein, the SIMO transmission mode indicates a multi-antenna transmission mode which transmits and receives signals using a single antenna at the transmitter and a plurality of antennas at the receiver.

In case of the MIMO transmission mode, the base station encounters more error in the receive data in the LOS channel environment than the non-LOS channel environment. Hence, in MIMO transmission under the LOS channel environment, a second set point 110 for the power control of the terminal continuously increases.

The base station increases the transmit power of the terminal according to the increase of the first set point 100. When the transmit power of the terminal increases over a certain level, the second set point 110 decreases again.

In the MIMO transmission mode described above, the set point for the power control of the terminal in the LOS channel environment increases continuously up to a certain level. Hence, the base station which operates in the MIMO transmission mode can recognize the LOS channel environment by considering the variation of the set point for the power control of the terminal as shown in FIG. 2.

Figure 2:
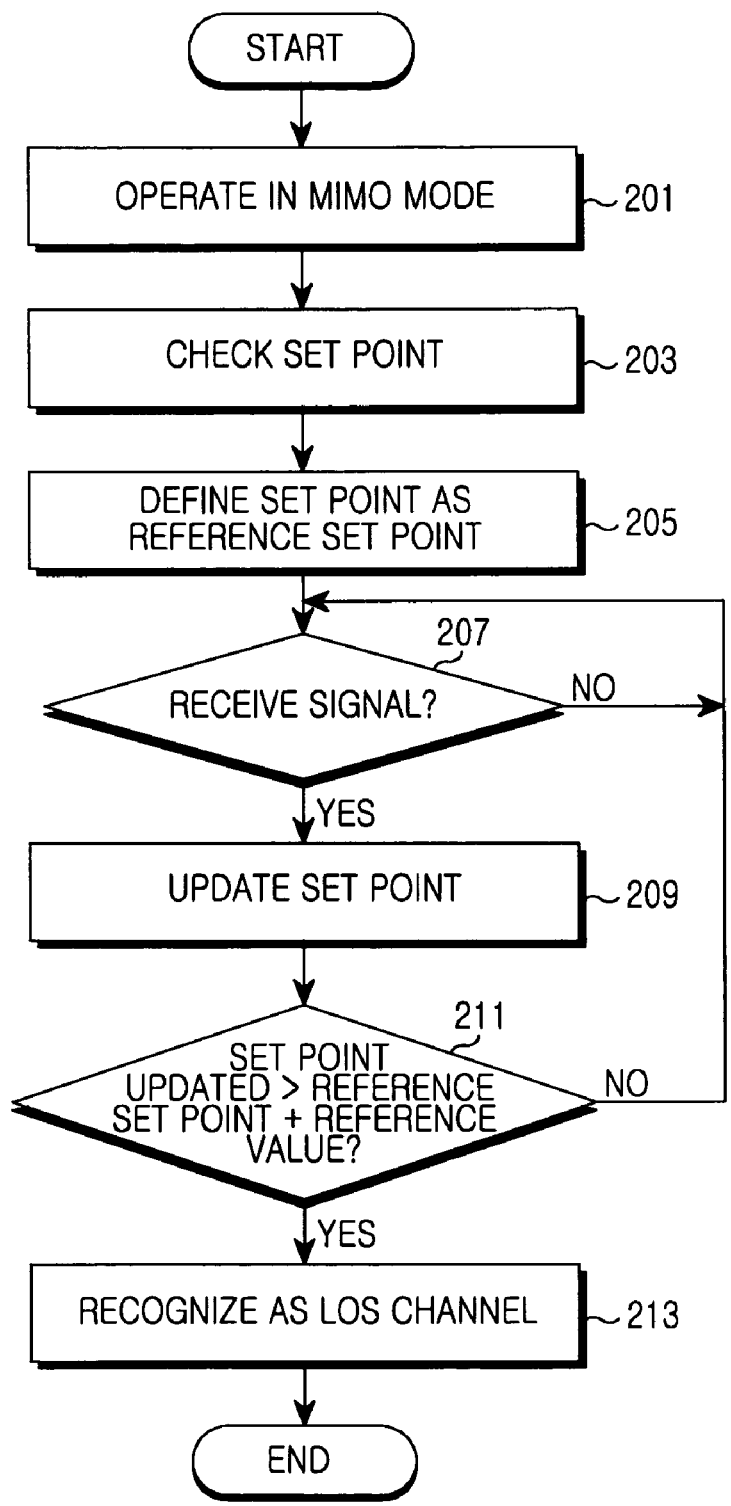
FIG. 2 illustrates a method for checking a LOS channel at a base station according to an exemplary embodiment of the present invention.

FIG. 2 illustrates a method for checking a LOS channel at a base station according to an exemplary embodiment of the present invention.

In step 201, the base station communicates using the MIMO transmission.

When communicating in the MIMO transmission mode, the base station checks the set point for the transmit power control of the terminal in step 203. For example, the base station checks the set point for the transmit power control of the terminal which is set when the MIMO transmission mode commences.

In step 205, the base station defines the set point checked in step 203 as a reference set point. For example, at commencing the MIMO transmission mode, the base station defines the set point for the transmit power control of the terminal, which is set when the MIMO transmission mode commences, as the reference set point.

In step 207, the base station determines whether a signal is received from the serviced terminal.

Upon receiving a signal from the terminal, the base station updates the set point for the power control of the terminal that sent the signal according to error in the received signal in step 209. For instance, when the received signal has error, the base station increases the set point for the power control of the terminal that sent the signal by the preset reference value OuterLp_Step as expressed in Equation 1. By contrast, when the received signal has no error, the base station decreases the set point for the power control of the terminal that sent the signal in proportion to $PER_{target}$.

After updating the set point for the power control of the terminal that sent the signal, the base station compares a sum of the reference set point and a reference value with the set point updated in step 209 in step 211. Herein, the reference value indicates a variable for checking the LOS channel by considering the change of the set point.

When the set point updated in step 209 is smaller than or equal to the sum of the reference set point and the reference value, the base station recognizes that the channel to the terminal is not the LOS channel. Thus, the base station goes back to step 207 and determines whether a signal is received from the serviced terminal.

When the set point updated in step 209 is greater than the sum of the reference set point and the reference value, the base station recognizes that the channel to the terminal is the LOS channel in step 213.

Next, the base station finishes this process.

In this exemplary embodiment, the base station checks the LOS channel by taking into account the change of the set point for the transmit power control of the terminal in the MIMO transmission mode.

In another exemplary embodiment, the base station may check for the LOS channel by considering variation in a Carrier to Interference and Noise Ratio (CINR) of the signal received from the terminal in the MIMO transmission mode.

Figure 3:
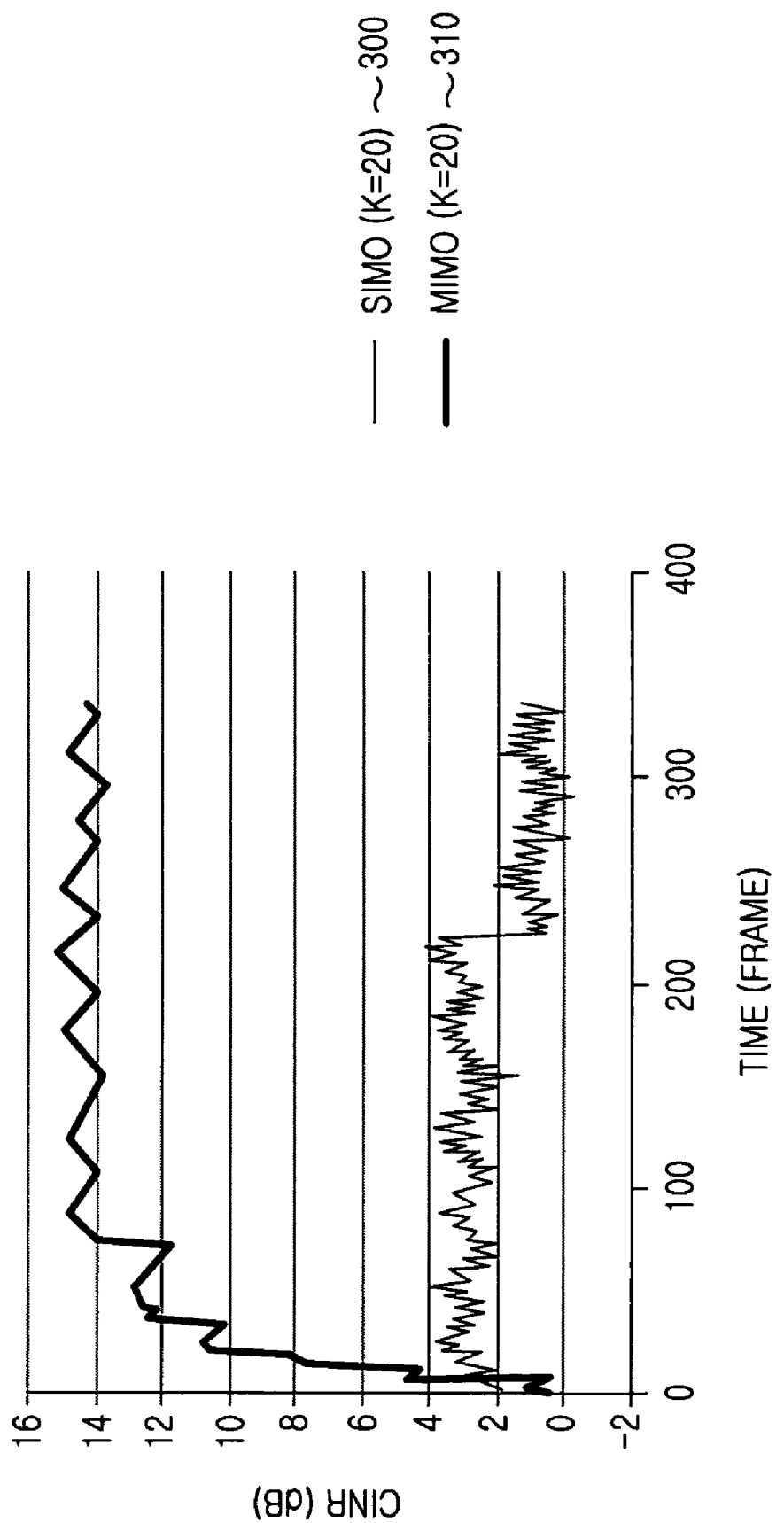
FIG. 3 illustrates a Carrier to Interference and Noise Ratio (CINR) variation in a LOS channel according to an exemplary embodiment of the present invention.

In the MIMO transmission mode, the received signal has error in the LOS channel environment, and the base station continuously increases the set point for the transmit power control of the terminal. Thus, the transmit power of the terminal increases continuously, and the CINR of the base station increases as shown in FIG. 3. Herein, the CINR of the base station indicates the CINR measured by the base station using the signal received from the terminal.

FIG. 3 depicts CINR variation in a LOS channel according to an exemplary embodiment of the present invention.

In the SIMO transmission mode, more error in the received signal occurs in the non-LOS channel environment than the LOS channel environment, and the base station continuously decreases the set point for the transmit power control of the terminal in the LOS channel environment as shown in FIG. 3. Hence, a first CINR 300 of the base station in the SIMO transmission mode maintains a constant value.

In the MIMO transmission mode, more error in the received signal occurs in the LOS channel environment than the non-LOS channel environment, and the base station continuously increases the set point of the MIMO transmission mode in the LOS channel environment. Thus, a second CINR 310 of the base station according to the MIMO transmission increases.

Since a maximum value of the transmit power of the terminal is limited, the second CINR 310 of the base station rises only up to a certain level.

As stated above, in the MIMO transmission mode, the CINR of the base station continues to increase in the LOS channel environment. The base station operating in the MIMO transmission mode can recognize the LOS channel environment by taking into account the CINR change of the base station as shown in FIG. 4.

Figure 4:
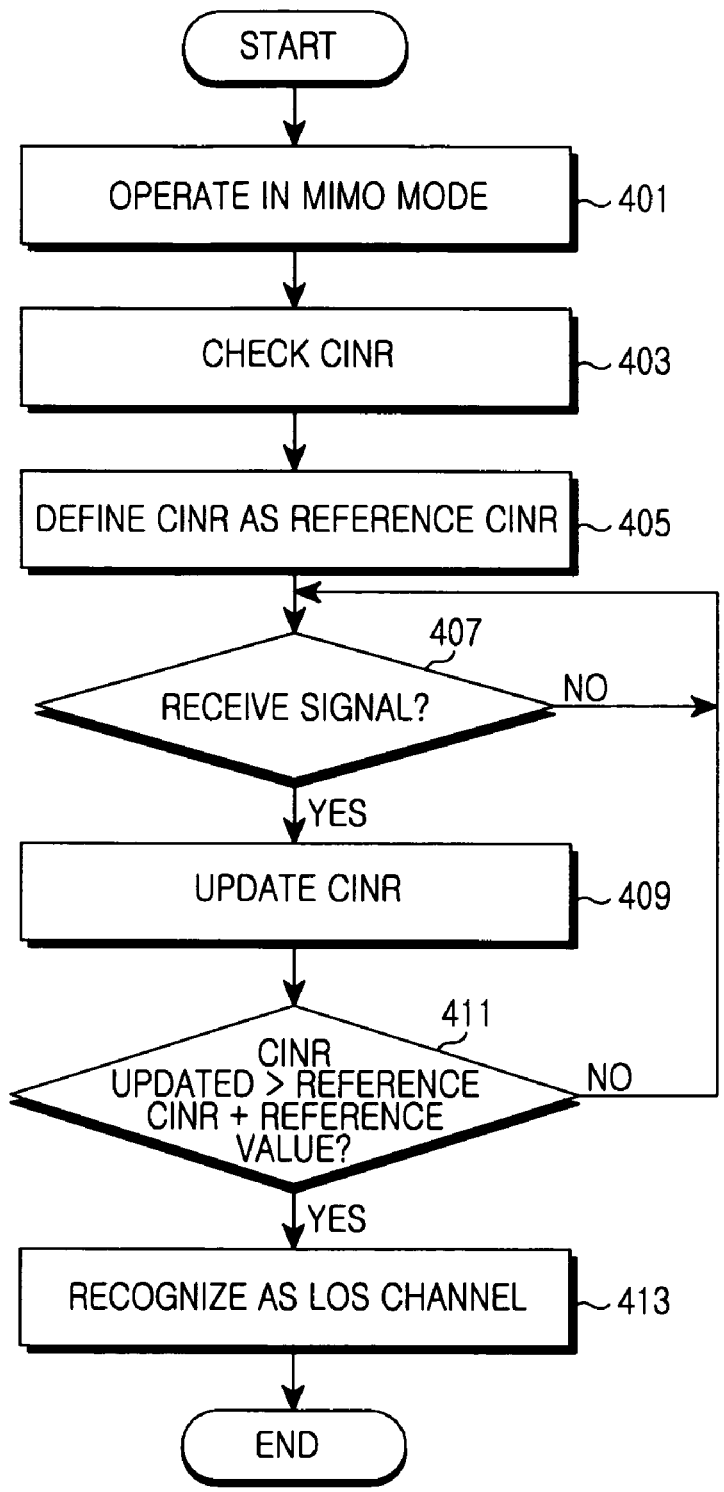
FIG. 4 illustrates a method for checking a LOS channel at a base station according to another exemplary embodiment of the present invention.

FIG. 4 illustrates a method for checking a LOS channel at a base station according to another exemplary embodiment of the present invention.

In step 401, the base station communicates using the MIMO transmission.

While communicating in the MIMO transmission mode, the base station checks the CINR of the signal received from the terminal in step 403. For example, the base station checks the CINR with respect to the signal received from the terminal at commencing the MIMO transmission.

In step 405, the base station defines the CINR checked in step 403 as a reference CINR. For example, at commencing the MIMO transmission mode, the base station defines its checked CINR as the reference CINR.

In step 407, the base station determines whether a signal is received from the serviced terminal.

Upon receiving the signal from the terminal, the base station updates its CINR using the received signal in step 409. For instance, the base station updates its CINR using the CINR estimated using the signal received in step 407.

After updating the CINR, the base station compares a sum of the reference CINR and a reference value with the CINR updated in step 409 in step 411. Herein, the reference value indicates a variable for checking the LOS channel by considering the change of the CINR of the base station.

When the CINR updated in step 409 is smaller than or equal to the sum of the reference CINR and the reference value, the base station recognizes that the channel to the terminal is not the LOS channel. Thus, the base station goes back to step 407 and determines whether a signal is received from the serviced terminal.

When the CINR updated in step 409 is greater than the sum of the reference CINR and the reference value, the base station recognizes that the channel to the terminal is the LOS channel in step 413.

Next, the base station finishes this process.

Figure 5:
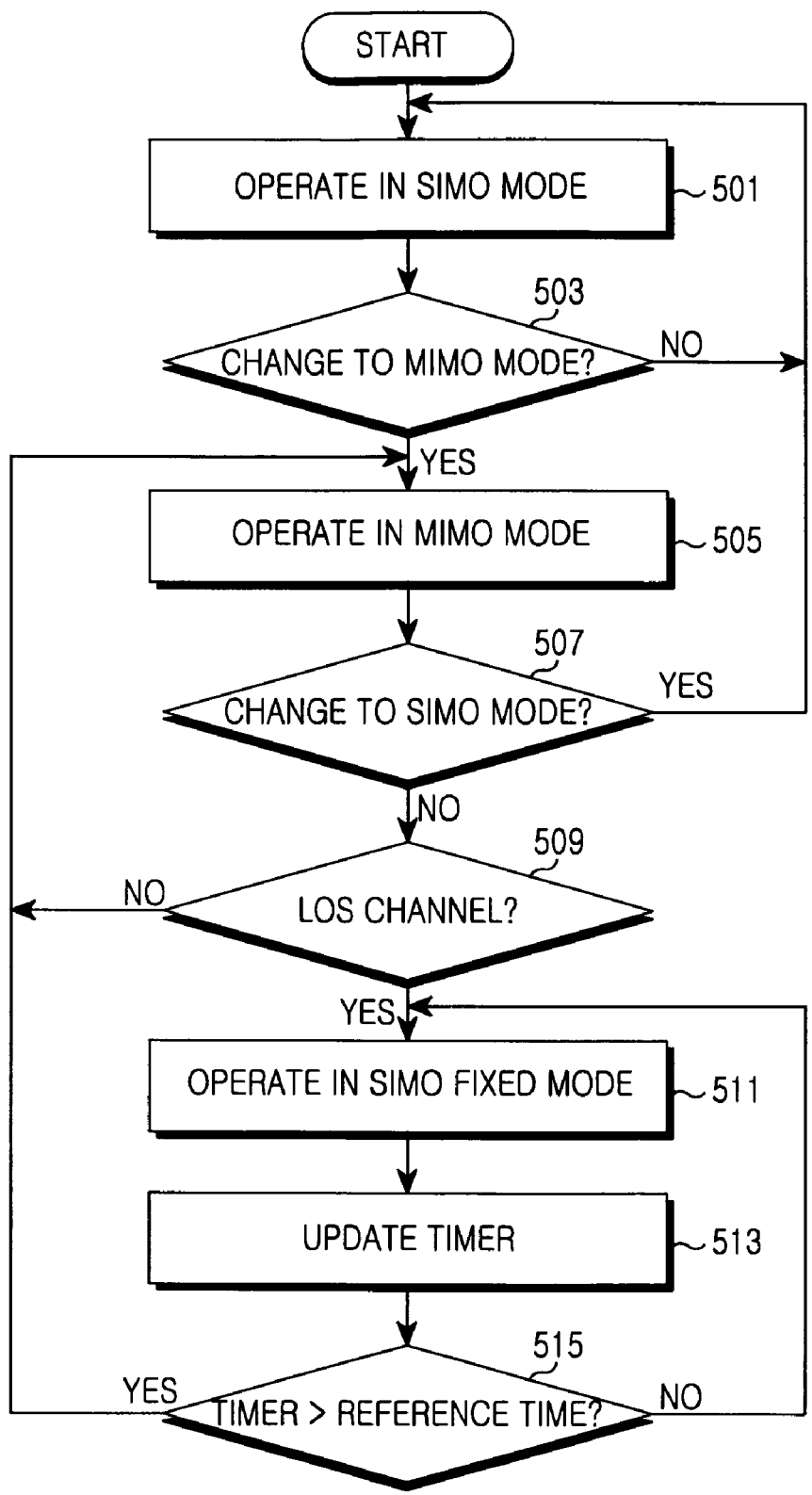
FIG. 5 illustrates a method for changing a transmission mode at a base station according to an exemplary embodiment of the present invention.

As stated above, in the MIMO transmission mode, the base station checks the LOS channel by considering the change of the set point for the power control of the terminal or the change of the CINR of the signal received from the terminal. The base station can determine the multi-antenna transmission mode in the uplink by taking into account the LOS channel environment as shown in FIG. 5. Hereafter, the base station is assumed to enter the SIMO transmission mode in the initial stage.

FIG. 5 illustrates a method for changing a transmission mode at a base station according to an exemplary embodiment of the present invention.

In step 501, the base station communicates in the SIMO transmission mode.

While communicating in the SIMO transmission mode, the base station determines whether to change the multi-antenna transmission mode in the uplink to the MIMO transmission mode in step 503. For example, when the transmit power of the terminal is less than a reference transmit power, the base station determines to switch to the MIMO transmission mode. Herein, the transmit power of the terminal indicates the normalized average of the transmit powers used when the terminal sends signals over a certain time period. The reference transmit power is determined based on the transmit capacity of the based station and the service coverage size of the base station.

Upon determining not to switch to the MIMO transmission mode, the base station goes back to step 501 and communicates in the SIMO transmission mode.

When determining to switch to the MIMO transmission mode, the base station communicates by changing the multi-antenna transmission mode in the uplink to the MIMO transmission mode in step 505.

As communicating in the MIMO transmission mode, the base station determines whether to change the multi-antenna transmission mode in the uplink to the SIMO transmission mode in step 507. For example, when the transmit power of the terminal is greater than the reference transmit power, the base station determines to change the multi-antenna transmission mode to the SIMO transmission mode. Herein, the transmit power of the terminal indicates the normalized average of the transmit powers used when the terminal sends signals over a certain time period. The reference transmit power is determined based on the transmit capacity of the based station and the service coverage size of the base station.

When determining to change to the SIMO transmission mode, the base station returns to step 501 and communicates by switching the multi-antenna transmission mode to the SIMO transmission mode.

Meanwhile, when determining not to change to the SIMO transmission mode, the base station checks whether the current channel to the terminal is the LOS channel in step 509. For example, the base station can determine whether the channel to the terminal is the LOS channel by considering the set point variation for the power control of the terminal as shown in FIG. 2. Alternatively, the base station may determine whether the channel to the terminal is the LOS channel by considering the CINR variation of the signal received from the terminal as shown in FIG. 4.

When the channel to the terminal is not the LOS channel in step 509, the base station communicates in the MIMO transmission mode in step 505.

When the channel the terminal is the LOS channel in step 509, the base station communicates by changing the multi-antenna transmission mode in the uplink to a SIMO fixed transmission mode in step 511. Herein, the SIMO fixed transmission mode indicates a multi-antenna transmission mode operating in the SIMO transmission mode without changing the multi-antenna transmission mode in the uplink during a reference time. That is, the reference time is a maximum operation time of the SIMO fixed transmission mode.

In step 513, the base station updates a timer for the operation time of the SIMO fixed transmission mode. For example, the base station increases the timer to check the reference time in the transition to the SIMO fixed transmission mode.

In step 515, the base station compares the timer updated in step 513 with the reference time.

When the timer time updated in step 513 is greater than the reference time, the base station communicates by changing the multi-antenna transmission mode in the uplink to the MIMO transmission mode in step 505.

When the timer time updated in step 513 is less than or equal to the reference time, the base station goes back to step 511 and communicates in the SIMO fixed transmission mode.

In this exemplary embodiment, when the timer time is greater than the reference time in step 515, the base station switches the multi-antenna transmission mode to the MIMO transmission mode in step 505.

Alternatively, when the timer time is greater than the reference time in step 515, the base station may proceed to step 501 and switch the multi-antenna transmission mode to the SIMO transmission mode.

Alternatively, when the timer time is greater than the reference time in step 515, the base station may proceed to step 503 and determine whether to change the multi-antenna transmission mode in the uplink to the MIMO transmission mode.

Now, a structure of the base station for selectively using the multi-antenna transmission mode according to the LOS channel environment is explained.

Figure 6:
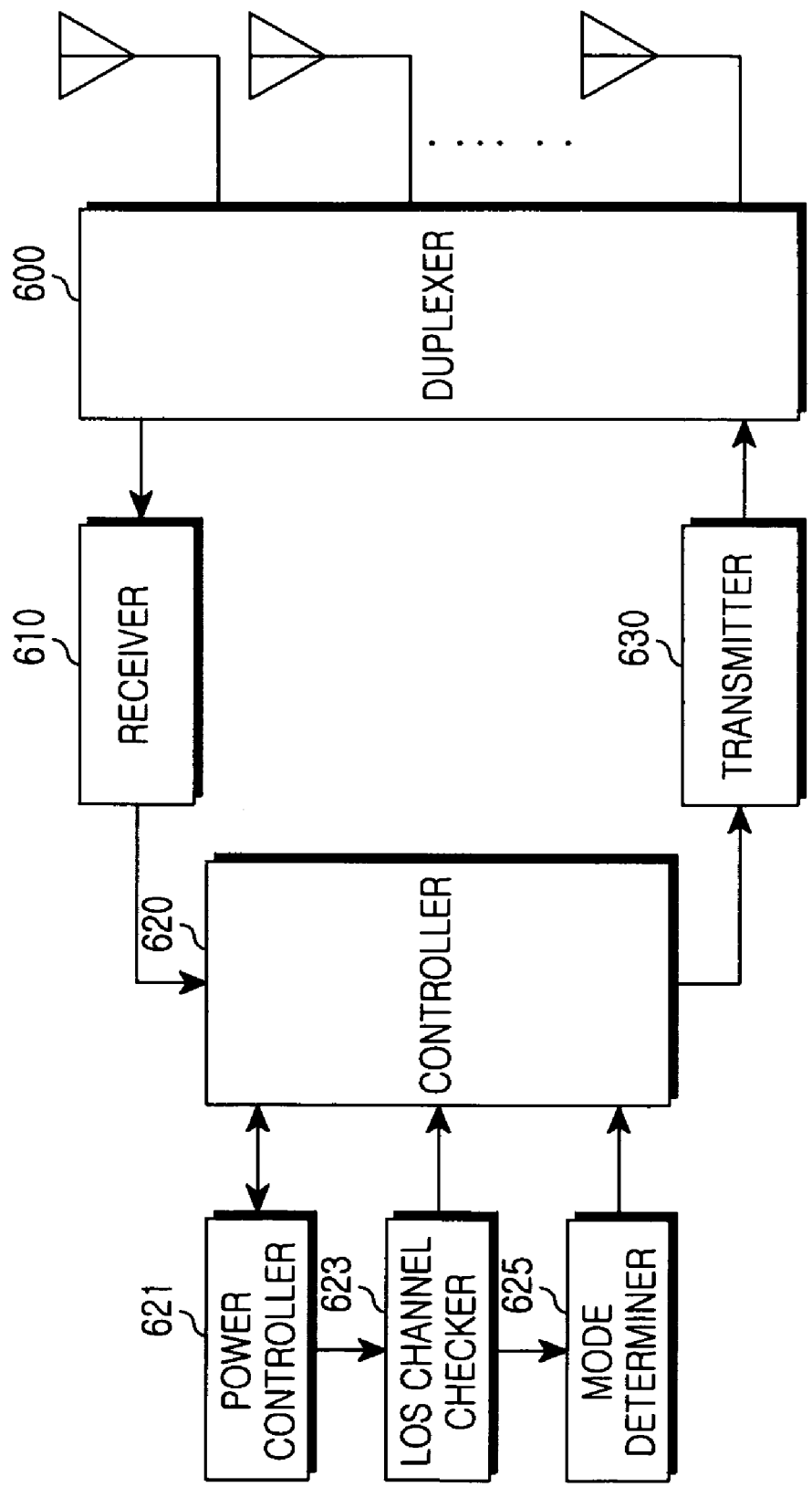
FIG. 6 illustrates a base station for changing a transmission mode according to an exemplary embodiment of the present invention.

When checking the LOS channel environment by considering the set point change for the power control of the terminal, the base station for selectively using the multi-antenna transmission mode is constructed as shown in FIG. 6.

FIG. 6 is a block diagram of the base station for changing the transmission mode according to an exemplary embodiment of the present invention.

The base station of FIG. 6 includes a duplexer 600, a receiver 610, a controller 620, a power controller 621, a LOS channel checker 623, a mode determiner 625, and a transmitter 630.

The duplexer 600 transmits a transmit signal received from the transmitter 630 over antennas and forwards a signal received over the antennas to the receiver 610 according to the duplexing scheme. For instance, using a time division duplex scheme, the duplexer 600 sends the transmit signal received from the transmitter 630 via the antennas in the transmission interval. In the reception interval, the duplexer 600 forwards the signal received via the antennas to the receiver 610. The duplexer 600 instructs the antennas to operate in the multi-antenna transmission mode determined by the mode determiner 625.

The receiver 610 processes a radio frequency signal received from the duplexer 600. For example, the receiver 610 includes a Radio Frequency (RF) processing module, a demodulation module, and a message processing module. The RF processing module converts the RF signal output from the duplexer 600 to a baseband signal. The demodulation module demodulates the baseband signal output from the RF processing module according to the communication mode with the terminal. The message processing module extracts a control message from the signal output from the demodulation module and provides the control message to the controller 620.

The controller 620 instructs the base station to communicate in the multi-antenna transmission mode determined by the mode determiner 625. For instance, the controller 620 instructs the duplexer 600 to operate in the multi-antenna transmission mode determined by the mode determiner 625.

The power controller 621 controls the transmit power of the terminal depending on the error occurrence of the signal received from the terminal. For example, when the received signal has error, the power controller 621 increases the set point for the transmit power control of the terminal that sent the signal by the preset reference value OuterLp_Step as expressed in Equation 1. By contrast, when the received signal has no error, the power controller 621 decreases the set point for the transmit power control of the terminal that sent the signal in proportion to $PER_{target}$.

Next, when the set point for the transmit power control of the terminal exceeds the power control reference, the power controller 621 causes the transmit power of the terminal to change.

The LOS channel checker 623 examines whether the channel to the terminal is the LOS channel by considering the change of the set point used by the power controller 621 to modify the transmit power of the terminal. For example, the LOS channel checker 623 defines the set point for the transmit power control of the terminal checked when the base station starts the MIMO transmission mode as the reference set point. Next, the LOS channel checker 623 checks for the LOS channel by comparing the sum of the reference set point and the reference value with the set point updated by receiving the signal from the terminal. When the updated set point is greater than the sum of the reference set point and the reference value, the LOS channel checker 623 recognizes that the channel to the terminal is the LOS channel.

The mode determiner 625 determines the multi-antenna transmission mode based on the transmit power of the terminal and the LOS channel environment information. For instance, when the transmit power of the terminal is greater than the reference transmit power, the mode determiner 625 determines the SIMO transmission mode as the multi-antenna transmission mode in the uplink. When the transmit power of the terminal is less than or equal to the reference transmit power, the mode determiner 625 determines the MIMO transmission mode as the multi-antenna transmission mode in the uplink. Herein, the reference transmit power is determined based on the transmit capacity of the base station and the service coverage size of the base station.

When the LOS channel checker 623 confirms that the channel to the terminal is the LOS channel in the MIMO transmission mode, the mode determiner 625 determines to switch to the SIMO fixed transmission mode. Herein, the SIMO fixed transmission mode indicates the multi-antenna transmission mode operating in the SIMO transmission mode without changing the multi-antenna transmission mode in the uplink during the reference time.

The transmitter 630 converts the transmit data and the control message to an RF signal and outputs the RF signal to the duplexer 600. For example, the transmitter 630 includes a message generator, a modulation module, and an RF processing module. The message generator generates the control message to send to the terminal. The modulation module modulates the transmit data and the control message generated by the message generator according to the communication mode of the terminal. The RF processing module converts the signal output from the modulation module to an RF signal and outputs the RF signal to the duplexer 600.

The controller 620 as constructed above controls the power controller 621, the LOS channel checker 623, and the mode determiner 625. In other words, the controller 620 can function as the power controller 621, the LOS channel checker 623, and the mode determiner 625. Herein, they are separately provided to distinguish their functions. In the actual implementation, the controller 620 can process all or part of the functions of the power controller 621, the LOS channel checker 623, and the mode determiner 625.

Figure 7:
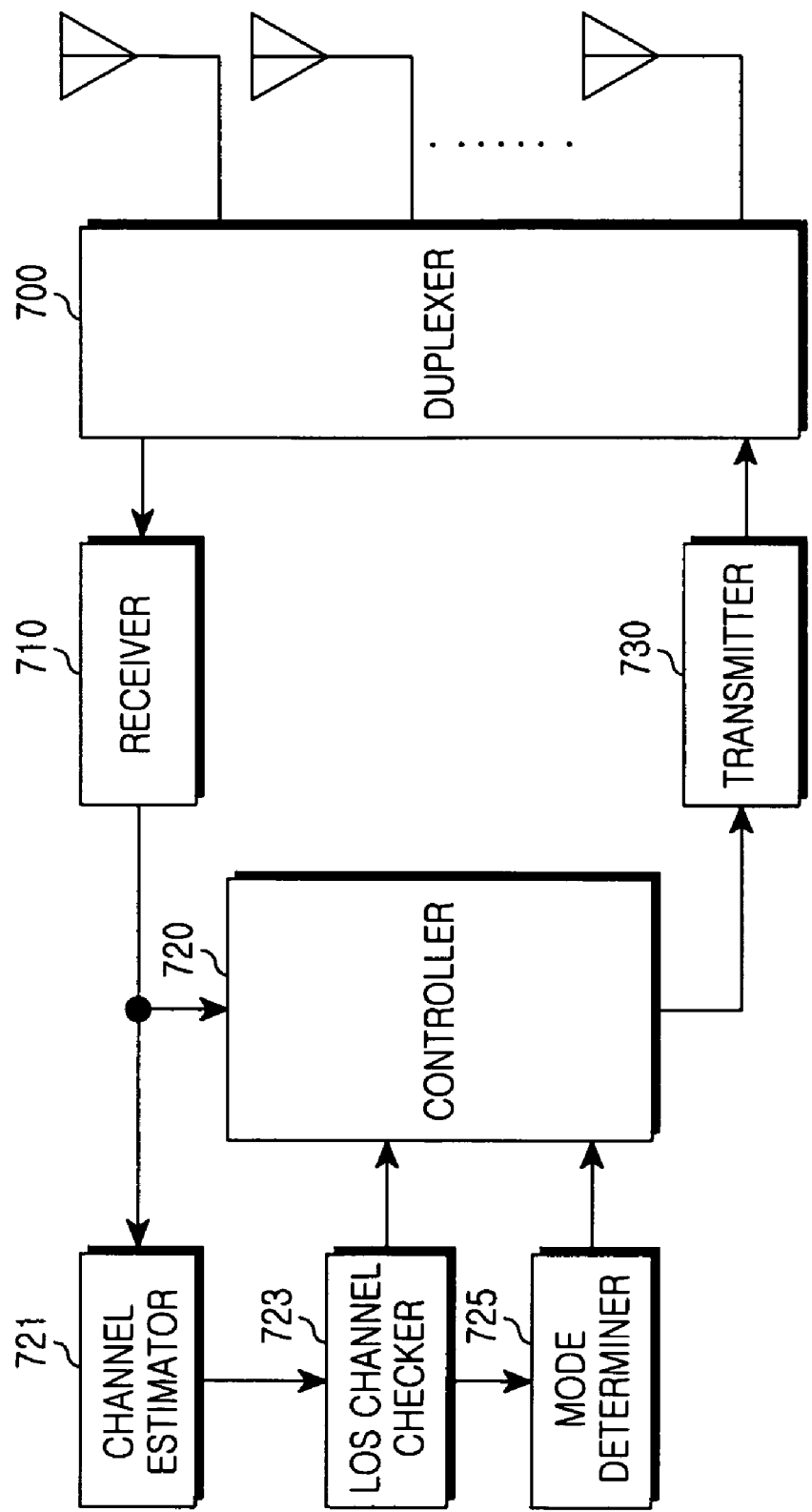
FIG. 7 illustrates a base station for changing a transmission mode according to another exemplary embodiment of the present invention.

To check for the LOS channel environment by considering the CINR variation of the signal received from the terminal, a base station for selectively using the multi-antenna transmission mode is constructed as shown in FIG. 7.

FIG. 7 is a block diagram of a base station for changing a transmission mode according to another exemplary embodiment of the present invention.

The base station of FIG. 7 includes a duplexer 700, a receiver 710, a controller 720, a channel estimator 721, a LOS channel checker 723, a mode determiner 725, and a transmitter 730.

The duplexer 700 transmits a transmit signal received from the transmitter 730 over antennas and forwards a signal received over the antennas to the receiver 710 according to the duplexing scheme. For instance, using a time division duplex scheme, the duplexer 700 sends the transmit signal received from the transmitter 730 via the antennas in the transmission interval. In the reception interval, the duplexer 700 forwards the signal received via the antennas to the receiver 710. The duplexer 700 controls the antennas in the multi-antenna transmission mode determined by the mode determiner 723.

The receiver 710 processes the RF signal received from the duplexer 700. For example, the receiver 710 includes an RF processing module, a demodulation module, and a message processing module. The RF processing module converts the RF signal output from the duplexer 700 to a baseband signal. The demodulation module demodulates the baseband signal output from the RF processing module according to the communication mode with the terminal. The message processing module extracts a control message from the signal output from the demodulation module and provides the control message to the controller 720.

The controller 720 instructs the base station to communicate in the multi-antenna transmission mode determined by the mode determiner 725. For instance, the controller 720 instructs the duplexer 700 to operate in the multi-antenna transmission mode determined by the mode determiner 725.

The channel estimator 721 estimates the CINR using the signal received from the receiver 710.

The LOS channel checker 723 examines whether the channel to the terminal is the LOS channel by considering the change of the CINR estimated by the channel estimator 721. For example, the LOS channel checker 723 defines the CINR measured when the base station starts the MIMO transmission mode as the reference CINR. Next, the LOS channel checker 723 checks for the LOS channel by comparing the sum of the reference CINR and the reference value with the CINR updated by receiving the signal from the terminal. When the updated CINR is greater than the sum of the reference CINR and the reference value, the LOS channel checker 723 recognizes that the channel to the terminal is the LOS channel.

The mode determiner 725 determines the multi-antenna transmission mode based on the transmit power of the terminal and the LOS channel environment information. For instance, when the transmit power of the terminal is greater than the reference transmit power, the mode determiner 725 determines the SIMO transmission mode as the multi-antenna transmission mode in the uplink. When the transmit power of the terminal is less than or equal to the reference transmit power, the mode determiner 725 determines the MIMO transmission mode as the multi-antenna transmission mode in the uplink. Herein, the reference transmit power is determined based on the transmit capacity of the base station and the service coverage size of the base station.

When the LOS channel checker 723 confirms that the channel to the terminal is the LOS channel in the MIMO transmission mode of the base station, the mode determiner 725 determines to switch to the SIMO fixed transmission mode.

The transmitter 730 converts the transmit data and the control message to an RF signal and outputs the RF signal to the duplexer 700. For example, the transmitter 730 includes a message generator, a modulation module, and an RF processing module. The message generator generates the control message to send to the terminal. The modulation module modulates the transmit data and the control message generated by the message generator according to the communication mode with the terminal. The RF processing module converts the signal output from the modulation module to an RF signal and outputs the RF signal to the duplexer 700.

The controller 720 as constructed above controls the LOS channel checker 723 and the mode determiner 725. In other words, the controller 720 can function as the LOS channel checker 723 and the mode determiner 725. Herein, they are separately provided to distinguish their functions. In the actual implementation, the controller 720 can process all or part of the functions of the LOS channel checker 723 and the mode determiner 725.

As set forth above, the base station of the multi-antenna system determines the multi-antenna transmission mode depending on the LOS channel environment by considering the set point for the power control of the terminal or the CINR of the signal received from the terminal. Therefore, the overall performance of the multi-antenna system can be enhanced by raising the data transfer efficiency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a multi-antenna transmission mode at a base station in a multi-antenna system, the method comprising:

when operating in a Multiple Input Multiple Output (MIMO) transmission mode as a multi-antenna transmission mode, determining a reference set point;

updating a set point for transmit power control of a terminal according to an error occurrence in a signal received from the terminal;

determining whether a channel to the terminal is a channel for applying the MIMO transmission mode by comparing the updated set point with the reference set point; and when the channel to the terminal is not the channel for applying the MIMO transmission mode, changing the multi-antenna transmission mode to a fixed transmission mode, wherein the reference set point comprises a value for determining whether the channel to the terminal is the channel for applying the MIMO transmission mode, and the fixed transmission mode is a multi-antenna transmission mode operating in a Single Input Multiple Output (SIMO) transmission mode during a reference time.

2. The method of claim 1, wherein the reference set point comprises the set point for the transmit power control of the terminal when communication starts in the MIMO transmission mode.

3. The method of claim 1, wherein the updating of the set point comprises:

when the signal received from the terminal has error, increasing the set point by a reference value OuterLp_Step; and when the signal received from the terminal has no error, decreasing the set point in proportion to a target packet error rate $PER_{target}$ of the terminal.

4. The method of claim 1, wherein the determining of the channel for applying the MIMO transmission mode comprises:

determining whether the channel to the terminal is a Line of Sight (LOS) channel by comparing the updated set point with the reference set point, when the channel to the terminal is a LOS channel, recognizing the channel to the terminal as a channel not for applying the MIMO transmission mode, and when the channel to the terminal is not a LOS channel, recognizing the channel to the terminal as a channel for applying the MIMO transmission mode.

5. The method of claim 4, wherein, when the channel to the terminal is the channel for applying the MIMO transmission mode, the set point for the transmit power control of the terminal is updated.

6. The method of claim 1, wherein the determining of the channel for applying the MIMO transmission mode comprises:

calculating a sum of the reference set point and a reference variable; and determining whether the channel to the terminal is a channel for applying the MIMO transmission mode by comparing the calculated sum with the updated set point, wherein the reference variable indicates a variable for determining whether the channel to the terminal is a channel for applying the MIMO transmission mode based at least partly upon a change of the set point.

7. A method for determining a multi-antenna transmission mode at a base station in a multi-antenna system, the method comprising:
when operating in a Multiple Input Multiple Output (MIMO) transmission mode as a multi-antenna transmission mode, determining a reference Carrier to Interference and Noise Ratio (CINR);
measuring a CINR using a signal received from a terminal;
determining whether a channel to the terminal is a channel for applying the MIMO transmission mode by comparing the measured CINR with the reference CINR; and
when the channel to the terminal is not a channel for applying the MIMO transmission mode, changing the multi-antenna transmission mode to a fixed transmission mode,
wherein the reference CINR comprises a CINR for determining whether the channel to the terminal is a channel for applying the MIMO transmission mode, and
the fixed transmission mode is a multi-antenna transmission mode operating in a Single Input Multiple Output (SIMO) transmission mode during a reference time.

8. The method of claim 7, wherein the reference CINR is a CINR measured when communication starts in the MIMO transmission mode.

9. The method of claim 7, wherein the determining of the channel for applying the MIMO transmission mode comprises:
determining whether the channel to the terminal is a Line of Sight (LOS) channel by comparing the measured CINR with the reference CINR,
when the channel to the terminal is a LOS channel, recognizing the channel to the terminal as a channel for not applying the MIMO transmission mode, and
when the channel to the terminal is not a LOS channel, recognizing the channel to the terminal as a channel for applying the MIMO transmission mode.

10. The method of claim 9, wherein, when the channel to the terminal is the channel for applying the MIMO transmission mode, the CINR is measured.

11. The method of claim 7, wherein the determining of the channel for applying the MIMO transmission mode comprises:
calculating a sum of the reference CINR and a reference variable; and
determining whether the channel to the terminal is a channel for applying the MIMO transmission mode by comparing the calculated sum with the measured CINR,
wherein the reference variable indicates a variable for determining whether the channel to the terminal is a channel for applying the MIMO transmission mode based at least partly upon a change of the CINR.

12. An apparatus for determining a multi-antenna transmission mode at a base station in a multi-antenna system, the apparatus comprising:
at least two antennas;
a receiver configured to receive a signal via the antennas;
a power controller configured to update a set point for transmit power control of a terminal according to an error occurrence of a signal received from the terminal when using a Multiple Input Multiple Output (MIMO) transmission mode as a multi-antenna transmission mode;
a channel checker configured to determine whether a channel to the terminal is a channel for applying the MIMO transmission mode by comparing the set point updated by the power controller with a reference set point; and
a mode determiner configured to select the multi-antenna transmission mode over a fixed transmission mode when the channel to the terminal is not a channel for applying the MIMO transmission mode,
wherein the reference set point comprises a value configured to determine whether the channel to the terminal is a channel for applying the MIMO transmission mode, and
the fixed transmission mode is a multi-antenna transmission mode operating in a Single Input Multiple Output (SIMO) transmission mode during a reference time.

13. The apparatus of claim 12, wherein the channel checker uses the set point for the transmit power control of the terminal when communication starts in the MIMO transmission mode as the reference set point.

14. The apparatus of claim 12, wherein the power controller increases the set point by a reference value OuterLp_Step when the signal received from the terminal has error,
the power controller decreases the set point in proportion to a target packet error rate $PER_{target}$ of the terminal when the signal received from the terminal has no error.

15. The apparatus of claim 12, wherein the channel checker is configured to determine whether the channel to the terminal is a Line of Sight (LOS) channel by comparing the set point updated by the power controller with the reference set point, to recognize the channel to the terminal as a channel for not applying the MIMO transmission mode when the channel to the terminal is a LOS channel, and to recognize the channel to the terminal as a channel for applying the MIMO transmission mode when the channel to the terminal is not the LOS channel.

16. The apparatus of claim 12, wherein the channel checker is configured to determine whether the channel to the terminal is the channel for applying the MIMO transmission mode by comparing a sum of the reference set point and a reference variable with the set point updated by the power controller, and
the reference variable indicates a variable for determining whether the channel to the terminal is the channel for applying the MIMO transmission mode based at least partly upon a change of the set point.

17. An apparatus for determining a multi-antenna transmission mode at a base station in a multi-antenna system, the apparatus comprising:
at least two antennas;
a receiver configured to receive a signal via the antennas;
a channel estimator configured to measure a Carrier to Interference and Noise Ratio (CINR) using a signal received from a terminal when using a Multiple Input Multiple Output (MIMO) transmission mode as a multi-antenna transmission mode of an uplink;
a channel checker configured to determine whether a channel to the terminal is a channel for applying the MIMO transmission mode by comparing the CINR measured by the channel estimator with a reference CINR; and
a mode determiner configured to select the multi-antenna transmission mode over a fixed transmission mode when the channel to the terminal is not the channel for applying the MIMO transmission mode,
wherein the reference CINR comprises a CINR configured to determine whether the channel to the terminal is the channel for applying the MIMO transmission mode, and the fixed transmission mode is a multi-antenna transmission mode operating in a Single Input Multiple Output (SIMO) transmission mode during a reference time.

18. The apparatus of claim 17, wherein the channel checker is configured to use the CINR measured when communication starts in the MIMO transmission mode as the reference CINR.

19. The apparatus of claim 17, wherein the channel checker is configured to determine whether the channel to the terminal is a Line of Sight (LOS) channel by comparing the CINR measured by the channel estimator with the reference CINR, to recognize the channel to the terminal as a channel not for applying the MIMO transmission mode when the channel to the terminal is the LOS channel, and to recognize the channel to the terminal as a channel for applying the MIMO transmission mode when the channel to the terminal is not the LOS channel.

20. The apparatus of claim 17, wherein the channel checker is configured to determine whether the channel to the terminal is a channel for applying the MIMO transmission mode by comparing a sum of the reference CINR and a reference variable with the CINR measured by the channel estimator, and the reference variable indicates a variable for determining whether the channel to the terminal is a channel for applying the MIMO transmission mode by considering change of the CINR.

* * * * *